United States Patent Office 3,414,621
Patented Dec. 3, 1968

---

3,414,621
METHOD FOR THE PREPARATION OF AMINES FROM OXAZOLINES
Clarence R. Bresson and Raymond L. Cobb, Bartlesville, Okla., assignors to Phillips Petroleum Company, a corporation of Delaware
No Drawing. Filed Oct. 4, 1965, Ser. No. 492,885
6 Claims. (Cl. 260—584)

ABSTRACT OF THE DISCLOSURE

Hydroxy-substituted amine compounds containing at least one substituent in the 2-position selected from the group consisting of mercaptomethyl and hydrocarbothiomethyl are prepared by contacting an oxazoline having at least one hydroxymethyl substituent at the 4-position with a hydrocarbon sulfonyl halide, treating the resulting product with an alkali metal mercaptide and hydrolyzing the reaction product with a mineral acid to produce said hydroxy-substituted amine compounds.

---

This invention relates to a novel method for synthesizing multifunctional amine compounds. In one aspect this invention relates to the synthesizing of hydroxy amino compounds having a multiplicity of mercaptomethyl and hydrocarbothiomethyl groups substituted thereon. In another aspect, this invention relates to a process for the production of 2 - hydroxy-1,1-bis(mercaptomethyl)ethylamine and compounds related thereto in improved yields.

The object of this invention is to provide a novel method for improving the yield in the synthesis of hydroxy amino compounds containing a multiplicity of mercaptomethyl and hydrocarbothiomethyl groups substituted thereon.

Another object of this invention is to provide a method for increasing the yield of 2-hydroxy-1,1-bis(mercaptomethyl)ethylamine.

Other objects and advantages will be apparent from the following detailed description of the invention, and the novel features will be particularly pointed out hereinafter in connetion with the appended claims.

Briefly, the process of this invention comprises the steps of contacting an oxazoline compound, having at least one hydroxymethyl substituent in the 4-position with a hydrocarbon sulfonyl halide; treating the resulting product with an alkali metal mercaptide and hydrolyzing the reaction product with a mineral acid to form a hydroxy-substituted amine containing at least one substituent in the 2-position selected from the group consisting of mercaptomethyl and hydrocarbylthiomethyl.

The process of this invention is best described by means of the following generic formulae in which the first step is illustrated by the following equation:

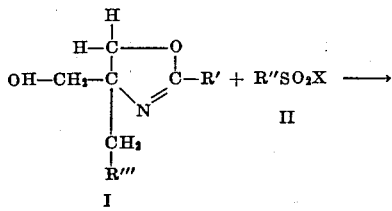

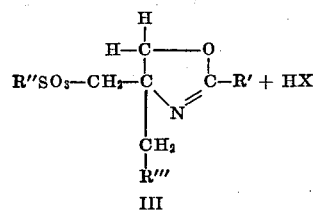

If R''' is OH then compounds having the formula

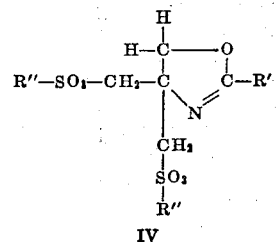

will also be formed. R' is selected from the group consisting of aryl and alkaryl radicals containing from 6 to 12 carbon atoms, inclusive; R''' is selected from the group consisting of hydrogen, hydroxyl, 1–12 carbon alkoxy radicals and R''; wherein R'' is selected from the group consisting of alkyl, aryl, aralkyl, alkaryl, cycloalkyl, and combinations thereof, containing from 1–12 carbon atoms and wherein X is selected from the group consisting of chlorine and bromine.

This reaction of the oxazoline compound (Formula I) with the sulfonyl halide (Formula II) is generally carried out at a temperature in the range from −10 to 75° C. for a period of time ranging from a few minutes to several days, preferably less than 24 hours. This reaction is preferably carried out in the presence of a tertiary amine diluent. Such tertiary amine diluents can contain, as a cosolvent, other diluents such as acetone and ethers. However, when acetone or ethers are employed, the amount of tertiary amine present should be sufficient to react with the HX produced by the reaction. Examples of suitable tertiary amine diluents are pyridine, quinoline, trimethylamine, triethylamine, N-methylpiperidine, and the like.

Representative examples of oxazoline compounds having Formula I which can be employed in the first step of the process of this invention are as follows:

2-phenyl-4,4-bis(hydroxymethyl)oxazoline
2-p-tolyl-4-methyl-4-hydroxymethyloxazoline
2-naphthyl-4-methoxymethyl-4-hydroxymethyloxazoline
2-phenyl-4-isooctyl-4-hydroxymethyloxazoline
2-(4-ethylphenyl)-4-n-hexoxymethyl-4-hydroxymethyloxazoline
2-(4-n-hexylphenyl)-4-tridecyl-4-hydroxymethyloxazoline
2-naphthyl-4-n-dodecoxymethyl-4-hydroxymethyloxazoline
2-p-tolyl-4-benzyl-4-hydroxymethyloxazoline
2-(4-n-hexylphenyl)-4-(2-n-butylbenzyl)-4-hydroxymethyloxazoline Examples of sulfonyl halides having Formula II which can be employed as one of the reactants in the first step of the process of this invention are as follows:

methanesulfonyl chloride
ethanesulfonyl bromide
n-butanesulfonyl chloride
n-dodecanesulfonyl chloride
benzenesulfonyl chloride
p-toluenesulfonyl chloride
2-phenylethanesulfonyl bromide
cyclohexanesulfonyl chloride
4-methylcyclohexanesulfonyl bromide
cyclododecanesulfonyl chloride
and the like.

The hydrocarbylsulfonyl-substituted compounds of Formula III and IV produced by the reaction described hereinabove are reacted with an alkali metal mercaptide according to the following equations:

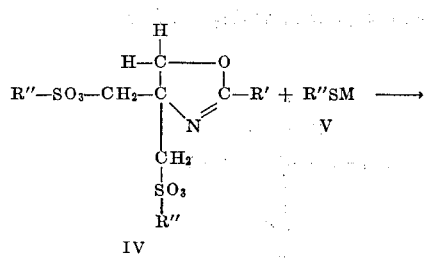

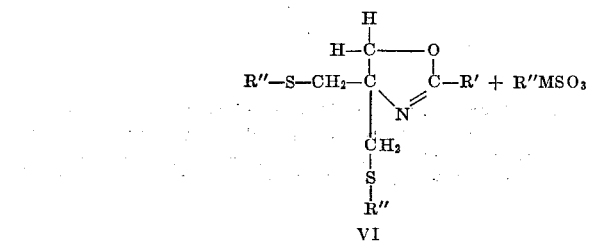

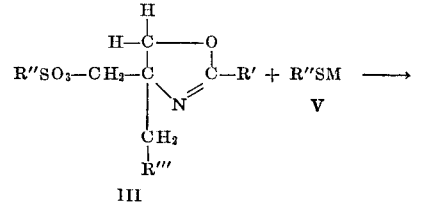

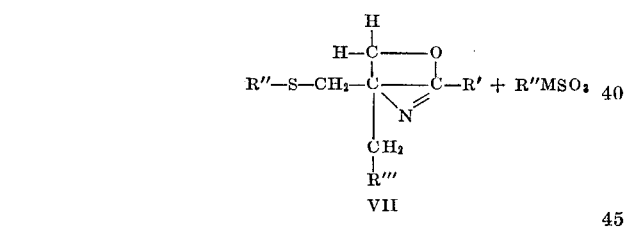

wherein R', R" and R'" are as defined hereinabove and M is an alkali metal, preferably sodium and potassium.

This reaction is generally carried out at a temperature ranging from 50–200° C., preferably above 75° C. The reaction time varies over a wide range but is generally less than 24 hours. It is preferably carried out in the presence of a solvent which includes low molecular weight alcohols, cyclic ethers, and N-alkylated amides. Examples of such diluents include methanol, ethanol, isopropanol, n-propanol, tetrahydrofuran, dimethylformamide, and the like.

Examples of mercaptides which are suitable in the second step of the process include all the alkali metals, preferably sodium and potassium, of the following mercaptans: methyl mercaptan, ethyl mercaptan, tert-butyl mercaptan, n-hexyl mercaptan, isooctyl mercaptan, n-dodecyl mercaptan, thiophenol, thionaphthol, benzyl mercaptan, 4-phenylbutyl mercaptan, 3-phenylhexyl mercaptan, p-tolyl mercaptan, 4-n-hexylphenyl mercaptan, cyclohexyl mercaptan, cyclooctyl mercaptan, cyclododecyl mercaptan, 4-n-butylcyclohexyl mercaptan, 2-cyclohexylethyl mercaptan, and the like.

The hydrocarbylthio and mercapto-substituted oxazoline compounds are treated with a mineral acid, i.e., sulfuric, hydrochloric or phosphoric, under conditions sufficient to cause hydrolysis of the ring portion of the compounds of Formulate VI and VII.

The conditions employed for this hydrolysis reaction will usually range from 25 to 100° C. for a period of time ranging from a few minutes to several days, preferably from 0.5 to 24 hours. The hydrolysis reaction can be represented by the following equation:

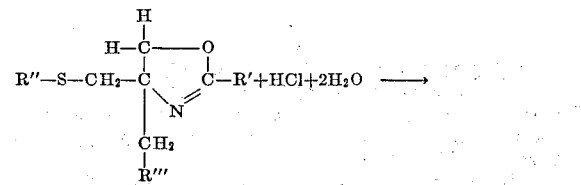

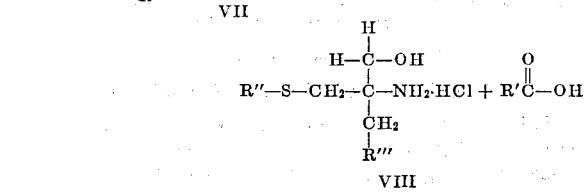

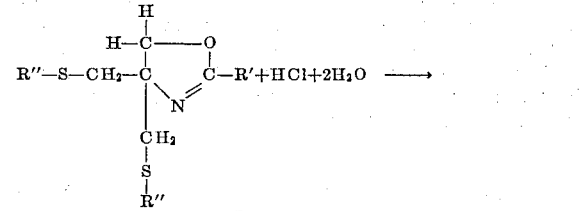

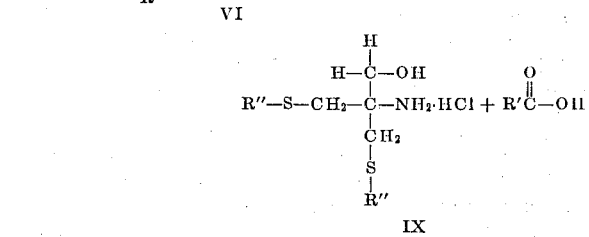

Examples of compounds of Formula VIII which can be prepared by the process of this invention are as follows:

2-amino-2-methylthiomethyl-1-propanol
2-amino-2[(2,4,6-triethylphenyl)thiomethyl]-3-dodecyloxy-1-propanol
2-amino-2-cyclohexylthiomethyl-4-phenyl-1-n-butanol
2-amino-2-isobutylthiomethyl-1-n-butanol
2-amino-2-α-naphthylthiomethyl-3-cyclopentyl-1-propanol
2-amino-2[(2-phenylethyl)thiomethyl]-5-ethyl-1-nonanol
2-amino-2[(2,6-dimethylcyclohexyl)thiomethyl]-1-pentanol Examples of compounds of Formula IX which can be prepared by the process of this invention are as follows:

2-hydroxy-1,1-bis(methylthiomethyl)ethylamine
2-hydroxy-1,1-bis(n-dodecylthiomethyl)ethylamine
2-hydroxy-1,1-bis(benzylthiomethyl)ethylamine
2-hydroxy-1,1-bis(cyclohexylthiomethyl)ethylamine
2-hydroxy-1,1-bis[(2-methyl-4-n-butylphenyl)thiomethyl]ethylamine
2-hydroxy-1,1-bis[(3-cyclopentyl-n-butyl)thiomethyl]ethylamine
2-hydroxy-1,1-bis(ethylthiomethyl)ethylamine Examples of the mercaptomethyl-substituted compounds correspond to the above Formulae VIII and IX except that the hydrocarbothiomethyl groups are replaced with the mercaptomethyl group as described below.

In the embodiment calling for mercapto-substituted amines, the R" group attached to a sulfur atom is limited to an aryl methyl, such as benzyl, which can be replaced with a hydrogen atom by cleavage with an alkali metal in conjunction with ammonia or a suitable primary or secondary amine. The cleavage reaction is carried out at a temperature generally ranging from —50 to +50° C., depending upon the particular amine employed. When ammonia is used, it is preferred to operate below 0° C. Cosolvents or diluents of an etheral type such as tetrahydrofuran, p-dioxane and the like are employed. The amount of alkali metal should be at least stoichiometric with the active groups present as the alkali metal will also react with hydroxyl groups.

It is to be understood that the products produced by the subject method can be formed and used either as their free bases or as their acid salts, including the salts formed from inorganic and organic acids.

Furthermore, it is to be understood that separation, recovery and purification techniques such as fractional distillation, solvent extraction, crystallization, etc. can be used to separate and/or purify any of the intermediate or final products. It is to be understood that these products can be prepared in a continuous medium in the solvents disclosed hereinabove. The technique for the recovery of the specific compounds can vary somewhat due to the differences in molecular weight, solubility, boiling point and the like.

The following specific example is intended to illustrate the technique for carrying out the process of our invention which can be prepared by operating in accordance with the above description. However, it is not intended that this invention be limited to the specific features shown in this example.

EXAMPLE

A series of runs was carried out which ultimately yielded 2-hydroxy - 1,1 - bis(mercaptomethyl)ethylamine hydrochloride.

In the first step of this synthesis, 4,4-bis(hydroxymethyl)-2-phenyl-2-oxazoline, a compound within the scope of Formula I above, was synthesized and subsequently reacted with methanesulfonyl chloride. In the synthesis of the initial oxazoline compound, a mixture of 450 grams (3.71 mol) of 2-amino-2-hydroxymethyl-1,3-propanediol, 453 grams (3.71 mol) of benzoic acid, and one liter of xylene was heated to reflux temperature until 700 ml. of xylene had been removed, and the temperature reached 155° C. Water was then removed by azeotroping a water-xylene reaction overhead. Over a period of 24 hours, 130 ml. (96 percent of theory) of water was recovered, and the temperature rose to 180° C. The mixture was cooled to 80° C. by addition of 600 ml. of xylene and 300 ml. of acetone. After cooling the mixture to 15° C. in an ice bath, the crystalline product which precipitated out was filtered and washed with 600 ml. of cold acetone, and 672 grams (88 percent yield) of 4,4 - bis(hydroxymethyl)-2-phenyl-2-ozazoline, melting point 133–135° C., was obtained. The reported melting point of this compound is 131° C., as given in U.S. 2,556,791.

The above prepared compound was reacted with methanesulfonyl chloride in the following manner. 460 grams (4 mol) of methanesulfonyl chloride was added dropwise over a period of 3 hours to a solution of 414 grams (2 mol) of the above prepared ozazoline in 1250 ml. of pyridine. The solution was stirred and cooled in an ice bath during the addition of the methanesulfonyl chloride. The resulting mixture was allowed to stand overnight at room temperature, and was then poured into two liters of ice water. Stirring the aqueous mixture caused the precipitation of a white crystalline solid which was filtered out, washed once with water, twice with isopropanol and once with a mixture of ethanol and pentane to give a quantitative yield of the bis(methane sulfonate)ester of 4,4-bis(hydroxymethyl)-2 - phenyl-2-ozazoline, melting point 129–130° C. This material was confirmed as the desired compound by the following elemental analysis:

ELEMENTAL ANALYSIS

| Element | Calculated for $C_{13}H_{17}NO_7S_2$, wt. percent | Found, wt. percent |
| --- | --- | --- |
| Carbon | 42.96 | 42.98 |
| Hydrogen | 4.72 | 4.8 |
| Nitrogen | 3.86 | 4.4 |
| Sulfur | 17.65 | 17.7 |

The above prepared sulfonate compound was reacted with sodium benzylmercaptide in the following manner. A solution of 91 grams (0.25 mol) of the bis(methane sulfonate)ester of 4,4-bis(hydroxymethyl) - 2 - phenyl-2-oxazoline in 400 ml. of n-propanol was heated at reflux while adding 80 grams (0.55 mol) of sodium benzylmercaptide in 200 ml. of n-propanol. After heating the mixture for 6 hours, it was filtered hot to remove sodium methanesulfonate. The solvent was then removed from the filtrate, and a mixture of 250 ml. of concentrated hydrochloric acid and 150 ml. of water was added to the semisolid product. This mixture was heated at reflux for 30 hours and on cooling, the product solidified. The aqueous acid was then removed by decantation, and the solid was neutralized by adding a slurry of 20 grams of NaOH in 100 ml. of water. After filtering to remove undissolved NaCl and cooling, the aqueous mixture was extracted with three 100 ml. portions of ether. The ether was removed, the oil dissolved in 250 ml. of n-propanol, and the solution was saturated with dry hydrochloric acid. The crystalline solid which precipitated was filtered out and dried under vacuum to yield 63.3 grams (69 percent yield) of a material melting point 155–156° C. This material was confirmed as 2-hydroxy-1,1-bis(benzylthiomethyl)ethylamine hydrochloride by the following elemental analysis:

ELEMENTAL ANALYSIS

| Element | Calculated for $C_{18}H_{23}NOS_2 \cdot HCl$, wt. percent | Found, wt. percent |
| --- | --- | --- |
| Carbon | 58.43 | 58.3 |
| Hydrogen | 6.54 | 6.7 |
| Nitrogen | 3.79 | 3.9 |
| Sulfur | 17.33 | 17.15 |

The benzyl groups in the above prepared compound were then cleaved in the following manner to form 2-hydroxy-1,1-bis(mercaptomethyl)ethylamine hydrochloride. In this run, one liter of liquid ammonia was added to a slurry of 63.3 grams (0.171 mol) of 2-hydroxy-1,1-bis(benzylthiomethyl)ethylamine hydrochloride in 100 ml. of tetrahydrofuran, after which 18.9 grams (0.82 mol) of sodium was added by incremental addition. After all the sodium had been added, the reaction mixture was neutralized with 43.9 grams (0.82 mol) of ammonium chloride. The ammonia was then boiled off, and the product was slurried in 300 ml. of cold n-propanol, and saturated with dry HCl gas. The mixture was filtered, the solvent was removed from the filtrate and the residue was extracted to remove bibenzyl. The residual product was recrystallized from 350 ml. of a mixture containing isopropanol and ethanol in a 2.5:1 weight ratio. This yielded 20.6 grams (64 percent yield) of material having a melting point 134–135° C. which was confirmed as 2-hydroxy-1,1-bis(mercaptomethyl)ethylamine hydrochloride by the following elemental analysis:

ELEMENTAL ANALYSIS

| Element | Calculated for $C_4H_{11}NOS_2 \cdot HCl$, wt. percent | Found, wt. percent |
| --- | --- | --- |
| Carbon | 25.32 | 25.85 |
| Hydrogen | 6.38 | 6.5 |
| Nitrogen | 7.38 | 7.1 |
| Sulfur | 33.8 | 32.2 |

Overall yield in this process was 38 percent theoretical which is based on the starting material.

Obviously, many modifications and variations of the present invention are possible in the light of the above teachings. It is therefore to be understood that within the scope of the appending claims, the invention may be practiced otherwise than as specifically described herein.

We claim:
1. A method for synthesizing multifunctional amine compounds having the following general formula:

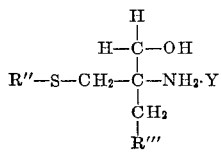

said method comprising the steps of reacting a compound having the formula

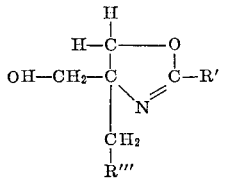

with a compound having the formula R″SO₂X; wherein R′ is selected from the group consisting of aryl radicals containing from 6–12 carbon atoms, inclusive; R″ is selected from the group consisting of alkyl, aryl, cycloalkyl and combinations thereof containing from 1–12 carbon atoms, R‴ is selected from the group consisting of hydrogen, hydroxyl, 1–12 carbon alkoxy radicals and R″, X is selected from the group consisting of chlorine and bromine, and Y is selected from the group consisting of HCl, H₂SO₄, and H₃PO₄; treating the reaction product with a compound having the formula R″SM wherein M is an alkali metal and hydrolyzing the reaction mixture thus obtained with a mineral acid selected from the group consisting of hydrochloric, sulfuric, and phosphoric.

2. A method according to claim 1 in which the first step is carried out in the presence of a solvent selected from the group consisting of low molecular weight alcohols, cyclic ethers, and N-alkylated amides.

3. A method according to claim 2 wherein the first step is accomplished at a temperature in the range of from −10° to 75° C., the second step is accomplished at a temperature in the range of from 50 to 200° C., and the third step is accomplished at a temperature in the range of from 25 to 100° C.

4. A method for synthesizing multifunctional amine compounds having the following general formula:

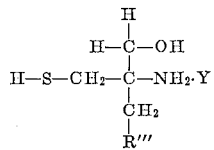

said method comprising the steps of reacting a compound having the formula

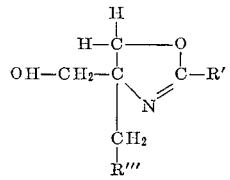

with a compound having the formula R″SO₂X, wherein R′ is selected from the group consisting of aryl radicals containing from 6–12 carbon atoms, inclusive; R″ is selected from the group consisting of alkyl, aryl, cycloalkyl and combinations thereof containing from 1–12 carbon atoms, R‴ is selected from the group consisting of hydrogen, hydroxyl, 1–12 carbon alkoxy radicals and R″, and X is selected from the group consisting of chlorine and bromine; and Y is selected from the group consisting of HCl, H₂SO₄ and H₃PO₄; treating the reaction product with a compound having the formula R″SM wherein M is an alkali metal and R″ in the R″SM molecule is an aryl methyl; hydrolyzing the reaction mixture with a mineral acid selected from the group consisting of hydrochloric, sulfuric and phosphoric; and reacting the hydrolyzed mixture with an alkali metal in the presence of ammonia.

5. A method according to claim 4 wherein the step of reacting the hydrolyzed mixture in an alkali metal in the presence of ammonia is accomplished at a temperature in the range of from −50° C. to 0° C.

6. A method for synthesizing 2-hydroxy-1,1-bis(mercaptomethyl)ethylamine hydrochloride, said method comprising the steps of reacting 4,4-bis(hydroxymethyl)-2-phenyl-2-oxazoline with methanesulfonyl chloride in the presence of pyridine; treating the reaction product with sodium benzyl mercaptide and hydrolyzing the reaction mixture with concentrated hydrochloric acid; treating the hydrolyzed reaction mixture with sodium in the presence of ammonia and recovering the product thus formed.

No references cited.

CHARLES B. PARKER, *Primary Examiner.*

R. L. RAYMOND, *Assistant Examiner.*